A. M. WRIGHT.
JOINT FOR HOSE CONNECTIONS.
APPLICATION FILED MAR. 16, 1914.
1,153,002.
Patented Sept. 7, 1915.
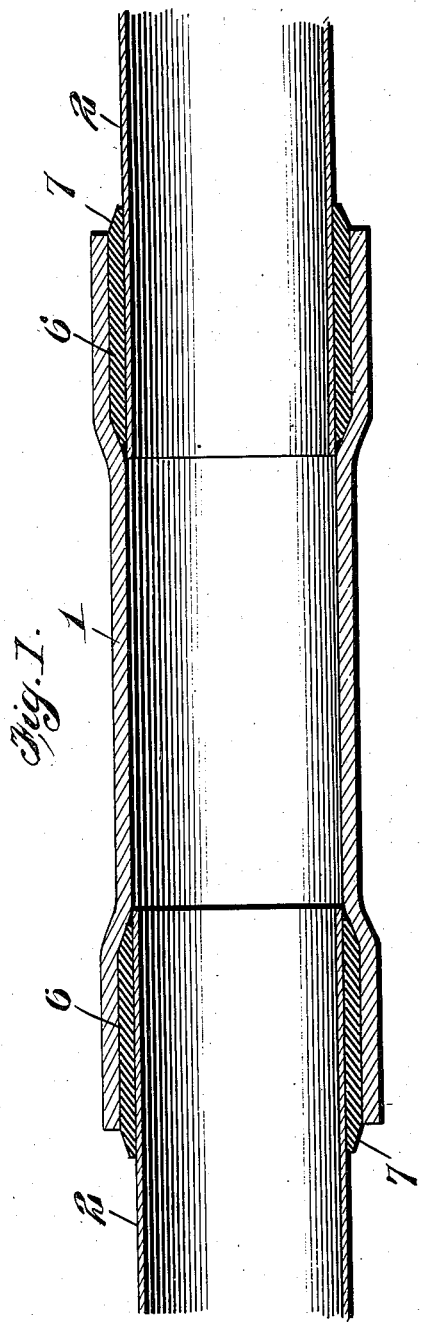
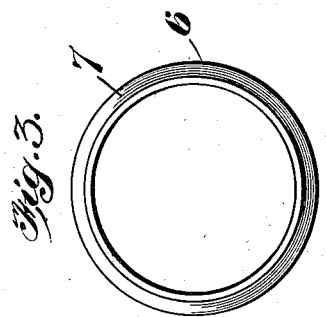
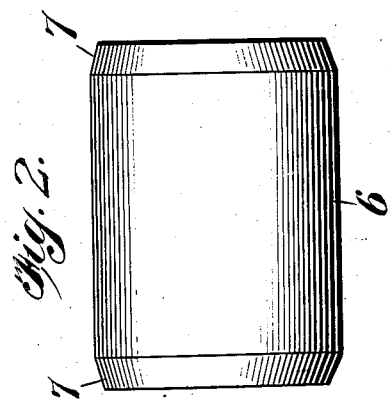

UNITED STATES PATENT OFFICE.

ALFRED M. WRIGHT, OF BLOOMINGTON, ILLINOIS.

JOINT FOR HOSE CONNECTIONS.

1,153,002.      Specification of Letters Patent.      Patented Sept. 7, 1915.

Application filed March 16, 1914. Serial No. 825,087.

*To all whom it may concern:*

Be it known that I, ALFRED M. WRIGHT, a citizen of the United States, residing at Bloomington, in the county of McLean and State of Illinois, have invented certain new and useful Improvements in Joints for Hose Connections, of which the following is a specification.

This invention relates to joints for hose connections, and, while applicable for general use wherever it may be employed, is especially designed for making water-tight connections between the radiator of an automobile and the pipe connections leading to the water jackets of the engine cylinders, by which a simple and secure connection will be afforded.

A further object of the invention is to provide a gasket or joint connection which will allow the end of a hose pipe to be conveniently applied in position, and which connection or gasket will hold the end of the hose securely to the pipe connection and prevent its accidental displacement, while permitting of its convenient removal when occasion requires, thus overcoming the well known objections to fittings of this character which are in common use.

The invention consists in the features of construction, combination and arrangement of parts, hereinafter described and claimed, reference being had to the accompanying drawings, in which:

Figure 1 is a longitudinal section between adjacent conductors or pipe sections and showing the hose pipe and gaskets; Fig. 2 is a side elevation of one of the gaskets; and Fig. 3 is an end elevation of the same.

In the present instance I have shown the application of my invention for use as a joint connection between the hose pipe sections 1 and metallic pipe sections 2 of a conductor which may connect the radiator of an automobile structure with the water jackets of the cylinders of the engine, it being understood that in practice the hose pipe sections 1 are disposed between the metallic pipe sections 2 in order to allow sufficient flexibility to avoid injury to or derangement of the parts from the vibrations of the engine and vehicle when in service. The ends of the hose pipe sections 1 are usually fitted and secured upon the ends of the metallic pipe sections 2, and, owing to the jars and vibrations to which the parts are subjected, the hose pipe sections 1 frequently work loose and cause considerable inconvenience and trouble, as well as leakage at the joints.

My invention is designed to overcome these objections and to provide a gasket or joint connection which will hold the ends of the hose pipe sections securely in place against possibility of dislocation, while at the same time maintaining an absolutely water-tight joint.

As shown particularly in Fig. 2, I provide gaskets 6 which are fitted upon the ends of the metallic pipe sections 2 and over which the ends of the hose pipe sections 1 are fitted. These gaskets or joint connections 6 may be made of soft or semi-vulcanized rubber or other suitable equivalent material and have their end portions 7 beveled to a very thin edge, allowing the ends of the hose pipe sections 1 to be easily and conveniently slipped over upon the same in making the connections, and when so placed forming a durable as well as water-tight connection or joint.

In practice, it is found that by employing a gasket of soft or semi-vulcanized rubber, or other suitable substance which has inherent adhesive qualities, the gasket in addition to adhering snugly to the metallic pipe sections 2 also sticks to the overlapping end of the hose pipe section 1 and thus forms a secure joint, which is proof against leakage and also against any tendency of the hose pipe section to creep and slip off the ends of the metallic pipe sections. Another valuable property of the gasket herein described is that it is soluble in gasolene or other hydrocarbons, so that if submerged for a short time in gasolene or an equivalent hydrocarbon it will soften and when applied in such a softened condition will have a sufficient degree of viscosity to stick to the surfaces of the metallic and hose pipe sections, so that when the hydrocarbon is evaporated by the heat from the circulating water the gasket in hardening will form an adhesive connection between the said pipe sections which will close the crevices and form a fluid-tight joint, in addition to holding the hose pipe section in place against any possibility of casual displacement under ordinary conditions of service. By softening the applied gaskets in a similar manner, the hose pipe sections and gaskets, if desired, may be conveniently removed, whenever it is desired to detach the hose pipe sections for any purpose.

Practical use has shown that a connection of the character described is not only secure and proof against leakage and displacement of the hose pipe sections under working strain and vibration, but is also of great durability, thus overcoming the annoyances and inconveniences attendant upon the use of ordinary fittings which are insecure and open to the constant tendency to displacement, thereby causing leakage.

Having thus described my invention, I claim:

1. The combination, with a metallic pipe section, of a hose pipe section having an end portion fitted over upon the metallic pipe section, and a gasket interposed between the interfitting ends of said pipe sections, said gasket comprising a body or sleeve having beveled end portions, said body or sleeve being formed of a plastic material capable of being softened so as to adhere to the surfaces of the said pipe sections through the solvent action of a hydrocarbon and to retain such state through the application of heat.

2. The combination of a metallic pipe section with a hose pipe section having an end portion fitted over upon the metallic pipe section by means of a connecting gasket interposed between the interfitting ends of the sections, said gasket being made of a tube of normally solid material having beveled end portions and adapted to be softened and rendered viscous by the action of a hydrocarbon and thereafter to be hardened by the action of heat and evaporation, rendering the joint water-tight and susceptible of withstanding the ordinary vibration of motion when in use. without breaking the connection.

In testimony whereof I affix my signature in presence of two witnesses.

ALFRED M. WRIGHT.

Witnesses:
    SAIN WELTY,
    LERLO J. OWEN.